US012759653B2

(12) United States Patent
Ishimura

(10) Patent No.: US 12,759,653 B2
(45) Date of Patent: Oct. 13, 2026

(54) TRAVELING APPARATUS

(71) Applicant: SHARP KABUSHIKI KAISHA, Sakai City (JP)

(72) Inventor: Ryoji Ishimura, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 336 days.

(21) Appl. No.: 18/613,409

(22) Filed: Mar. 22, 2024

(65) Prior Publication Data

US 2024/0336314 A1 Oct. 10, 2024

(30) Foreign Application Priority Data

Apr. 6, 2023 (JP) ................................ 2023-062062

(51) Int. Cl.
*B62D 61/10* (2006.01)
*B62D 39/00* (2006.01)

(52) U.S. Cl.
CPC ............ *B62D 61/10* (2013.01); *B62D 39/00* (2013.01)

(58) Field of Classification Search
CPC ................................ B62D 61/10; B62D 39/00
See application file for complete search history.

(56) References Cited

U.S. PATENT DOCUMENTS 3,161,172 A * 12/1964 Kassbohrer ............ B62D 61/10 280/124.171
3,183,991 A * 5/1965 Gamaunt ............... B62D 7/144 180/240
4,211,297 A * 7/1980 Dunbar .................. B62D 51/02 280/124.109
4,632,194 A * 12/1986 Averill .................... E21B 7/022 180/24.06
5,308,216 A * 5/1994 Herolf .................. A01G 23/003 180/209
6,454,286 B1 * 9/2002 Hosino ..................... B62B 5/02 280/5.2
2007/0107955 A1 * 5/2007 Puskar-Pasewicz ... B62D 61/10 180/65.1
2021/0171104 A1 * 6/2021 Xi .......................... B62D 63/02
2022/0250429 A1 * 8/2022 Gartner .................. B62D 9/002
2024/0094738 A1 * 3/2024 Nagasue ................. G01S 17/42

FOREIGN PATENT DOCUMENTS

CN 105329335 A * 2/2016 ............ B62D 61/10
CN 105523101 A * 4/2016 ............ B62D 61/10
CN 107235092 A * 10/2017 ............ B62D 61/10
(Continued)

*Primary Examiner* — Keith J Frisby
(74) *Attorney, Agent, or Firm* — ScienBiziP, P.C.

(57) ABSTRACT

A traveling apparatus includes a first left-side wheel, a second left-side wheel, and a third left-side wheel disposed in a front-rear direction on a left side of a vehicle body, and a first right-side wheel, a second right-side wheel, and a third right-side wheel disposed in the front-rear direction on a right side of the vehicle body, on a front wheel side or a rear wheel side, the first left-side wheel is connected to a left end portion of a first link member extending in a left-right direction, the first right-side wheel is connected to a right end portion of the first link member, and a first rotation shaft disposed at an intermediate position of the first link member is attached to a frame of the vehicle body.

4 Claims, 6 Drawing Sheets

(56) References Cited

FOREIGN PATENT DOCUMENTS

| | | | | | |
|---|---|---|---|---|---|
| CN | 108082329 | A | * | 5/2018 | ............. B62D 61/10 |
| CN | 109018070 | A | * | 12/2018 | ............. B62D 61/10 |
| CN | 110116769 | A | * | 8/2019 | ............. B62D 61/10 |
| CN | 110949565 | A | * | 4/2020 | ............. B62D 61/10 |
| CN | 112158275 | A | * | 1/2021 | ........... B60K 7/0007 |
| CN | 113147953 | A | * | 7/2021 | ............... B60G 5/02 |
| CN | 113247141 | A | * | 8/2021 | ............. B62D 61/10 |
| CN | 114524031 | A | * | 5/2022 | ............. B62D 61/10 |
| CN | 108791569 | B | * | 3/2024 | ............. B62D 61/10 |
| JP | 2019-204538 | A | | 11/2019 | |
| JP | 7281836 | B2 | * | 5/2023 | ............. B60B 19/00 |
| KR | 102264036 | B1 | * | 6/2021 | ............. B62D 61/10 |
| WO | WO-2019008673 | A1 | * | 1/2019 | ............. B62D 57/02 |
| WO | WO-2020262797 | A1 | * | 12/2020 | ........... B62D 57/024 |
| WO | WO-2022238002 | A1 | * | 11/2022 | ............. B62D 61/10 |

* cited by examiner

TRAVELING APPARATUS

INCORPORATION BY REFERENCE

This application is based upon and claims the benefit of priority from the corresponding Japanese Patent Application No. 2023-062062 filed on Apr. 6, 2023, the entire contents of which are incorporated herein by reference.

BACKGROUND

The present disclosure relates to a traveling apparatus.

Conventionally, there is known a traveling apparatus which includes traveling wheels and travels with a load loaded thereon or travels by towing a carriage on which a load is loaded.

However, in the related art, for example, when the difference in level of the floor surface is large or when the loaded load is large, it cannot be said that the traveling stability of the traveling apparatus is sufficient.

SUMMARY

An object of the present disclosure is to provide a traveling apparatus capable of improving traveling stability of the traveling apparatus.

A traveling apparatus according to an aspect of the present disclosure includes a first left-side wheel, a second left-side wheel, and a third left-side wheel disposed in a front-rear direction on a left side of a vehicle body, and a first right-side wheel, a second right-side wheel, and a third right-side wheel disposed in the front-rear direction on a right side of the vehicle body. On a front wheel side or a rear wheel side of the traveling apparatus, the first left-side wheel is connected to a left end portion of a first link member extending in a left-right direction, the first right-side wheel is connected to a right end portion of the first link member, and a first rotation shaft disposed at an intermediate position of the first link member is attached to a frame of the vehicle body.

According to the present disclosure, it is possible to provide a traveling apparatus capable of improving the traveling stability of the traveling apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. Note that the embodiments below are each a concrete example of the present disclosure, and are not intended to limit the technical scope of the present disclosure.

Figure 1:
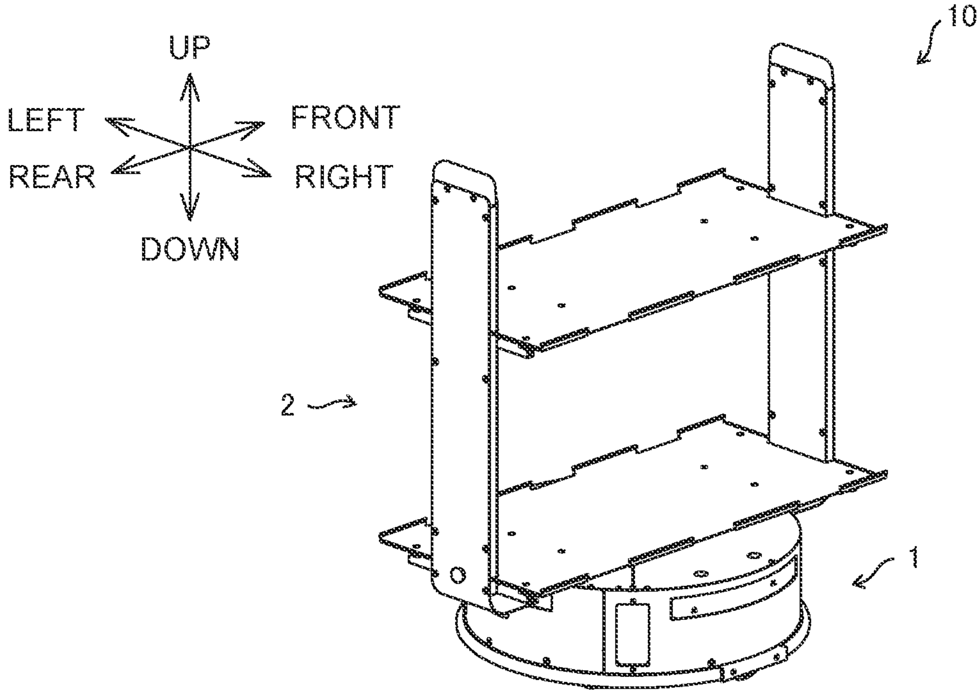
FIG. 1 is a perspective view showing an overall configuration of a traveling apparatus according to an embodiment of the present disclosure.
Figure 2:
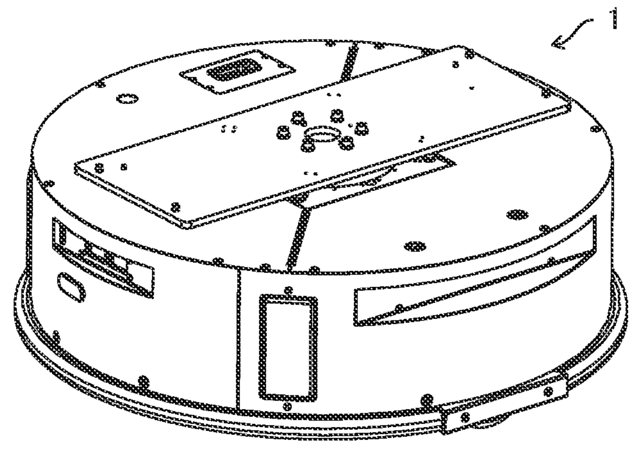
FIG. 2 is a perspective view showing an overall configuration of a traveling unit according to the embodiment of the present disclosure.

FIG. 1 is a perspective view showing an overall configuration of a traveling apparatus 10 according to an embodiment of the present disclosure. The traveling apparatus 10 is, for example, an automatic guided vehicle capable of unmanned traveling, and includes a traveling unit 1 and a shelf unit 2 connected to the traveling unit 1. FIG. 2 is a perspective view showing an overall configuration of the traveling unit 1.

The shelf unit 2 is a storage shelf capable of storing a conveyance object to be conveyed by the traveling apparatus 10. For example, the shelf unit 2 is placed on and connected to a top portion of the traveling unit 1. As another embodiment, the shelf unit 2 may be configured by a carriage including wheels and may be connected to the traveling unit 1 so as to be towed.

The traveling unit 1 has a circular outer shape in a top view (see FIG. 2), and is configured to be capable of forward traveling, backward traveling, and turning traveling (pivot turn) in which it turns on the spot. As shown in FIG. 2, the top portion of the traveling unit 1 has a configuration to which the shelf unit 2 can be connected. The top portion of the traveling unit 1 may include a coupling portion (e.g., a hook) to which a carriage can be coupled. The traveling unit 1 may also include a sensor that detects obstacles and the like. In addition, the traveling unit 1 may have a function of automatically traveling (autonomously traveling) along a traveling route set in advance while detecting obstacles, for example.

Figure 3:
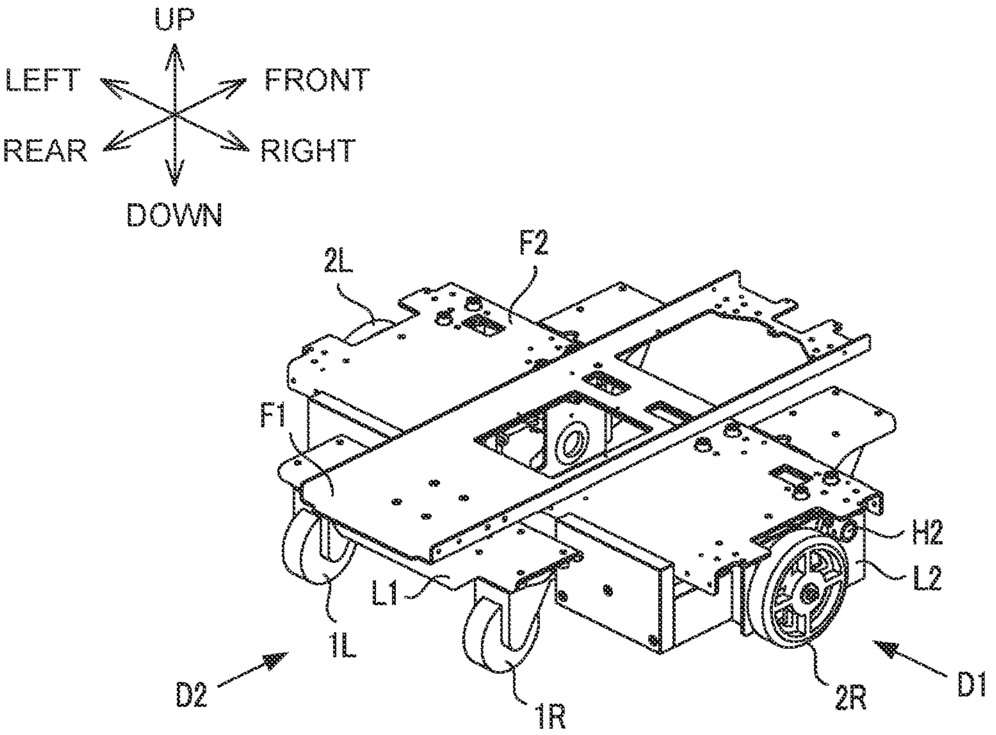
FIG. 3 is a perspective view showing an internal structure of the traveling unit according to the embodiment of the present disclosure.
Figure 4:
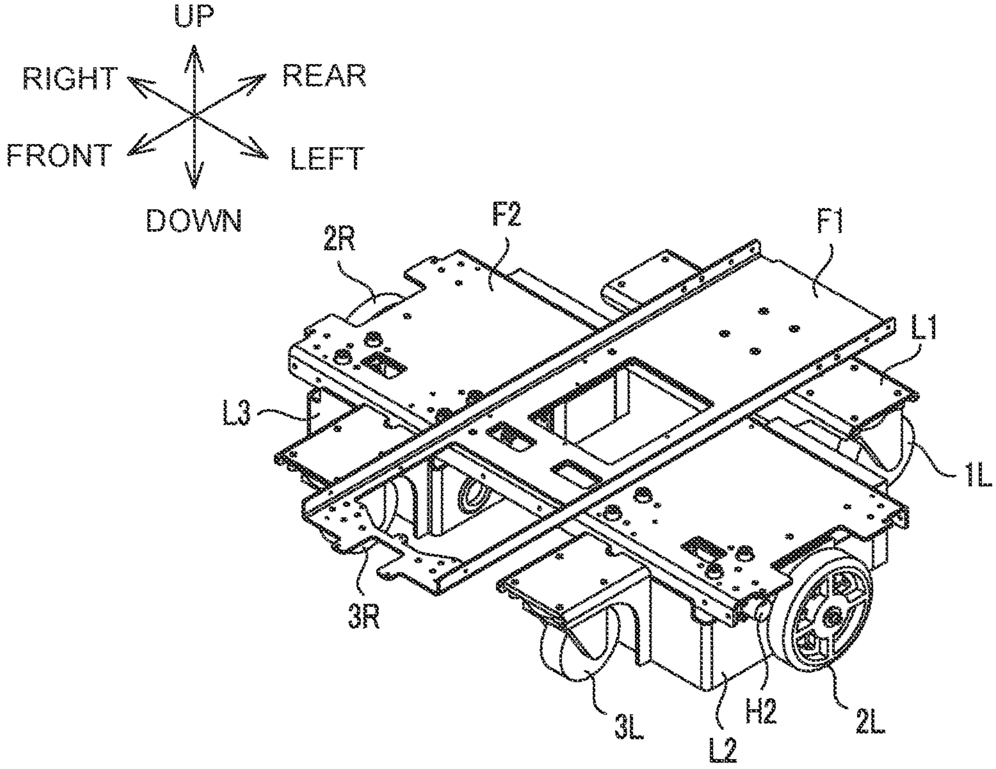
FIG. 4 is a perspective view showing the internal structure of the traveling unit according to the embodiment of the present disclosure.

FIGS. 3 and 4 show an example of an internal structure of the traveling unit 1 in which an exterior cover is omitted. The traveling unit 1 includes a first left-side wheel 1L, a second left-side wheel 2L, and a third left-side wheel 3L that are disposed in a front-rear direction on a left side of a vehicle body, and a first right-side wheel 1R, a second right-side wheel 2R, and a third right-side wheel 3R that are disposed in the front-rear direction on a right side of the vehicle body.

For example, the first left-side wheel 1L is disposed at the left rear side of the traveling unit 1, the second left-side wheel 2L is disposed at the center of the left side of the traveling unit 1, and the third left-side wheel 3L is disposed at the left front side of the traveling unit 1. The first right-side wheel 1R is disposed at the right rear side of the traveling unit 1, the second right-side wheel 2R is disposed at the center of the right side of the traveling unit 1, and the third right-side wheel 3R is disposed at the right front side of the traveling unit 1.

The second left-side wheel 2L and the second right-side wheel 2R are configured as driving wheels, and the first left-side wheel 1L, the third left-side wheel 3L, the first right-side wheel 1R, and the third right-side wheel 3R are configured as driven wheels. The driving wheel is driven by a motor driven by electric power supplied from a battery.

Further, the second left-side wheel 2L is disposed on the left side of the vehicle body relative to the first left-side wheel 1L and the third left-side wheel 3L with respect to a traveling direction, and the second right-side wheel 2R is disposed on the right side of the vehicle body relative to the first right-side wheel 1R and the third right-side wheel 3R with respect to the traveling direction. That is, of the first left-side wheel 1L, the second left-side wheel 2L, and the third left-side wheel 3L, the second left-side wheel 2L is disposed on the leftmost outer side of the vehicle body, and of the first right-side wheel 1R, the second right-side wheel 2R, and the third right-side wheel 3R, the second right-side wheel 2R is disposed on the rightmost outer side of the vehicle body.

According to the above configuration, for example, by rotationally driving the second left-side wheel 2L in a forward direction and rotating the second right-side wheel 2R in a backward direction, it is possible to cause the traveling unit 1 to make a clockwise pivot turn. Further, by rotationally driving the second left-side wheel 2L in the backward direction and rotating the second right-side wheel 2R in the forward direction, it is possible to cause the traveling unit 1 to make a counterclockwise pivot turn.

Further, in the traveling unit 1, the first left-side wheel 1L and the first right-side wheel 1R constitute a first bogie link mechanism BL1, the second left-side wheel 2L and the third left-side wheel 3L constitute a second bogie link mechanism BL2, and the second right-side wheel 2R and the third right-side wheel 3R constitute a third bogie link mechanism BL3.

Figure 5:
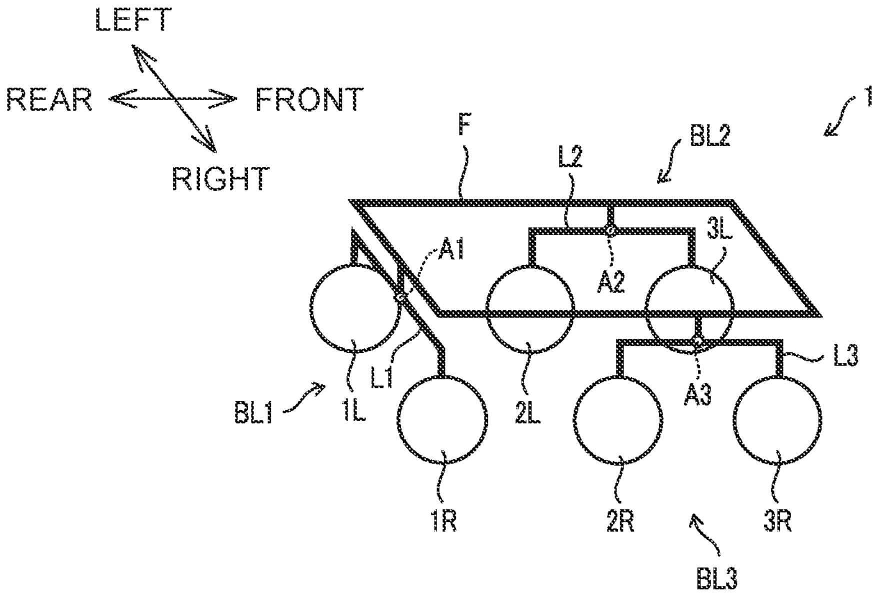
FIG. 5 is a schematic view showing configurations of bogie link mechanisms of the traveling unit according to the embodiment of the present disclosure.

FIG. 5 shows a schematic view of bogie link mechanisms in the traveling unit 1. As shown in FIG. 5, the first left-side wheel 1L is connected to a left end portion of a first link member L1 extending in the left-right direction, the first right-side wheel 1R is connected to a right end portion of the first link member L1, and a first rotation shaft A1 disposed at an intermediate position of the first link member L1 is attached to a frame F of the vehicle body of the traveling unit 1, thereby constituting the first bogie link mechanism BL1.

Further, as shown in FIG. 5, the second left-side wheel 2L is connected to a rear end portion of a second link member L2 extending in the front-rear direction, the third left-side wheel 3L is connected to a front end portion of the second link member L2, and a second rotation shaft A2 disposed at an intermediate position of the second link member L2 is attached to the frame F of the vehicle body of the traveling unit 1, thereby constituting the second bogie link mechanism BL2.

Further, as shown in FIG. 5, the second right-side wheel 2R is connected to a rear end portion of a third link member L3 extending in the front-rear direction, the third right-side wheel 3R is connected to a front end portion of the third link member L3, and a third rotation shaft A3 disposed at an intermediate position of the third link member L3 is attached to the frame F of the vehicle body of the traveling unit 1, thereby constituting the third bogie link mechanism BL3.

Hereinafter, specific configurations of the bogie link mechanisms according to the present embodiment will be described with reference to FIGS. 6 to 8.

Figure 6:
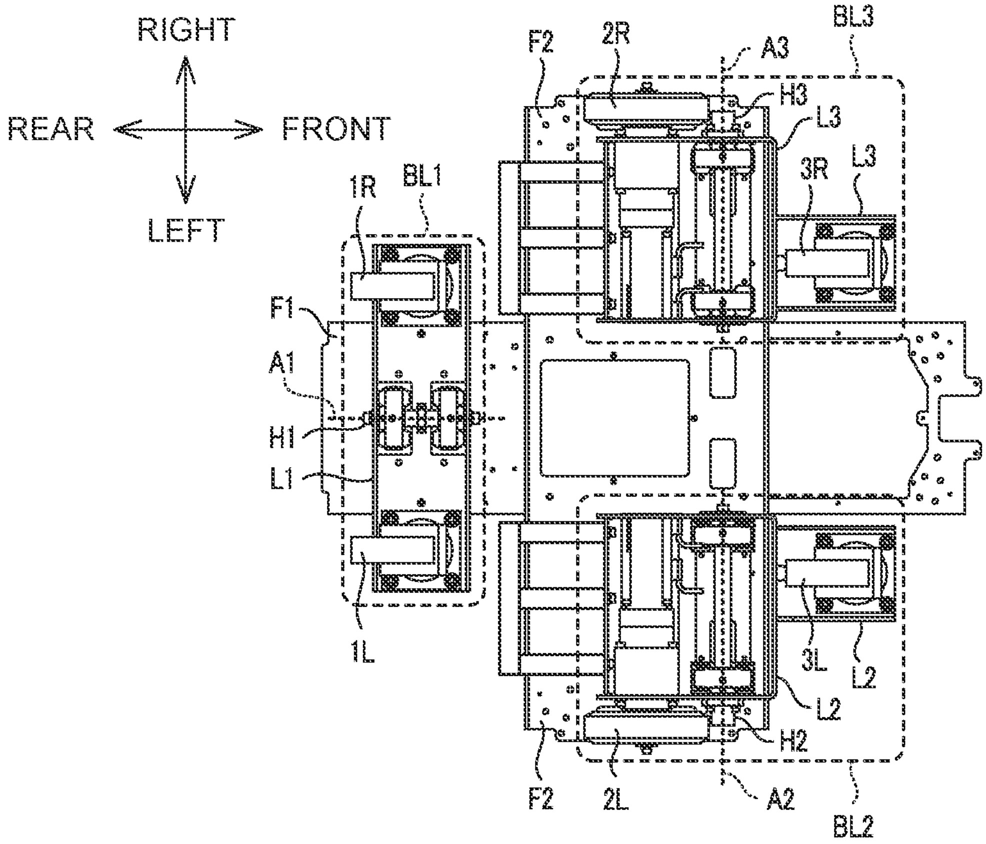
FIG. 6 is a bottom view of the traveling unit according to the embodiment of the present disclosure as viewed from a bottom direction.
Figure 7:
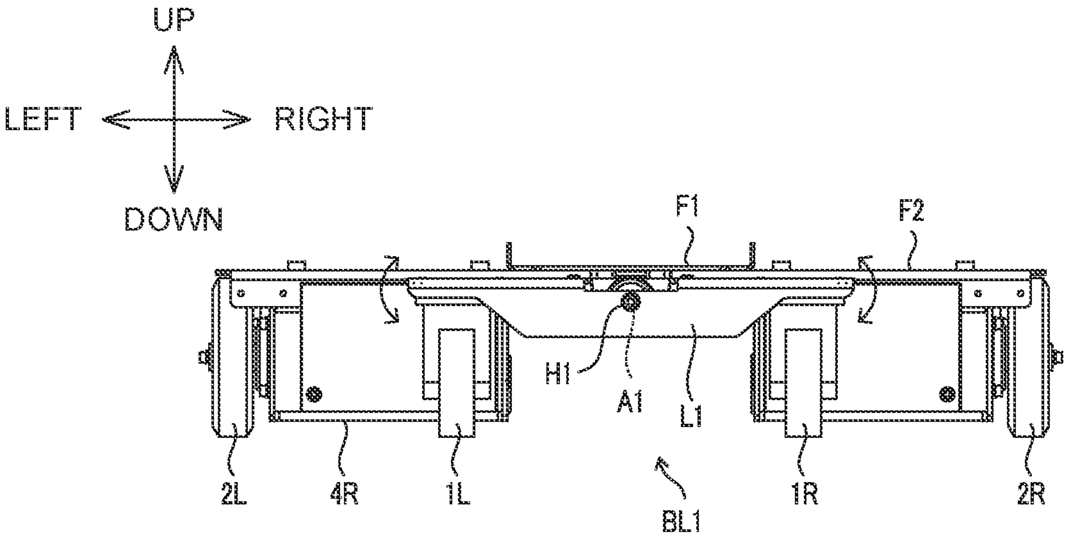
FIG. 7 is a rear view of the traveling unit according to the embodiment of the present disclosure as viewed from a rear side.
Figure 8:
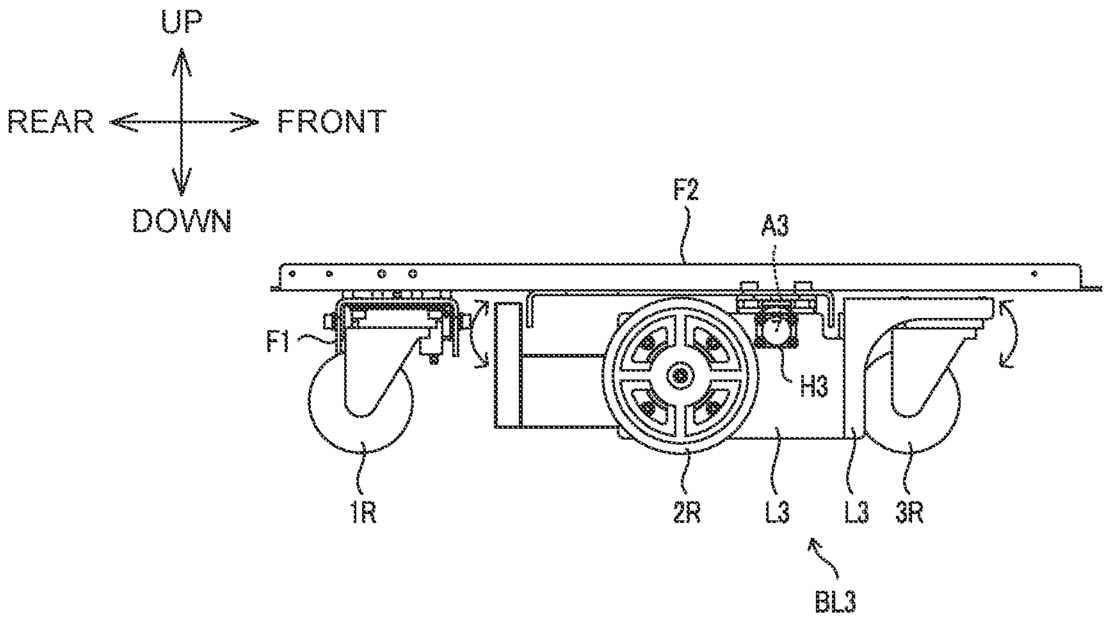
FIG. 8 is a right-side view of the traveling unit according to the embodiment of the present disclosure as viewed from a right side.

FIG. 6 is a bottom view of the traveling unit 1 as viewed from a bottom direction, FIG. 7 is a rear view as viewed from a D2 direction (rear) of FIG. 3, and FIG. 8 is a right side view as viewed from a D1 direction (right side) of FIG. 3.

The traveling unit 1 includes a first frame F1 and a second frame F2 of a vehicle body frame (see FIGS. 3 and 4). The first frame F1 is formed of a plate-shaped member (steel) extending in the front-rear direction of the vehicle body, and the second frame F2 is formed of a plate-shaped member extending in the left-right direction of the vehicle body. The first frame F1 and the second frame F2 are fixed to each other by coupling bolts or other means. Note that the first frame F1 and the second frame F2 may be formed integrally by a single member.

As shown in FIGS. 6 and 7, the first left-side wheel 1L is connected to the left end portion of the first link member L1 extending in the left-right direction, and the first right-side wheel 1R is connected to the right end portion of the first link member L1. The first link member L1 is formed of a plate-shaped member (steel). Further, a hinge mechanism H1 including the first rotation shaft A1 is provided at the intermediate position of the first link member L1, and the hinge mechanism H1 is connected to the first frame F1. In this way, the first link member L1 and the first frame F1 are connected to each other via the hinge mechanism H1, and the first link member L1 is rotatably connected to the first frame F1 about the first rotation shaft A1 in directions of arrows shown in FIG. 7.

That is, the first left-side wheel 1L, the first right-side wheel 1R, and the first link member L1 constitute the first bogie link mechanism BL1.

As shown in FIGS. 6 and 8, the second right-side wheel 2R is connected to the rear end portion (or rear) of the third link member L3 extending in the front-rear direction, and the third right-side wheel 3R is connected to the front end portion of the third link member L3. The third link member L3 is formed of a plate-shaped member (steel). Further, a hinge mechanism H3 including the third rotation shaft A3 is provided at the intermediate position of the third link member L3, and the hinge mechanism H3 is connected to the second frame F2. In this way, the third link member L3 and the second frame F2 are connected to each other via the hinge mechanism H3, and the third link member L3 is rotatably connected to the second frame F2 about the third rotation shaft A3 in directions of arrows shown in FIG. 8.

That is, the second right-side wheel 2R, the third right-side wheel 3R, and the third link member L3 constitute the third bogie link mechanism BL3.

Note that the position of the hinge mechanism H3 (the third rotation shaft A3) is not limited. For example, as shown in FIG. 8, the hinge mechanism H3 may be disposed on the second right-side wheel 2R side between the second right-side wheel 2R and the third right-side wheel 3R. The position of the hinge mechanism H3 is not limited, and may be any position between the second right-side wheel 2R and the third right-side wheel 3R. Further, when a ballast is provided on the rear side of the third link member L3 (for example, on the rear side of the second right-side wheel 2R), the position of the hinge mechanism H3 may be determined in accordance with the load on the second right-side wheel 2R against the floor surface.

Similarly, as shown in FIG. 6, the second left-side wheel 2L is connected to the rear end portion (or rear) of the second link member L2 extending in the front-rear direction, and the third left-side wheel 3L is connected to the front end portion of the second link member L2. The second link member L2 is formed of a plate-shaped member (steel). Further, a hinge mechanism H2 including the second rotation shaft A2 is provided at the intermediate position of the second link member L2, and the hinge mechanism H2 is connected to the second frame F2. In this way, the second link member L2 and the second frame F2 are connected to each other via the hinge mechanism H2, and the second link member L2 is rotatably connected to the second frame F2 bout the second rotation shaft A2.

That is, the second left-side wheel 2L, the third left-side wheel 3L, and the second link member L2 constitute the second bogie link mechanism BL2. Similarly to the hinge mechanism H3, the hinge mechanism H2 (the second rotation shaft A2) may be disposed on the second left-side wheel 2L side between the second left-side wheel 2L and the third left-side wheel 3L, as shown in FIG. 6.

As described above, the traveling unit 1 according to the present embodiment includes, in the left-right direction of the vehicle body, the bogie link mechanism (the first bogie link mechanism BL1) rotatable in an up-down direction, and, in the front-rear direction of the vehicle body, the bogie link mechanisms (the second bogie link mechanism BL2 and the third bogie link mechanism BL3) rotatable in the up-down direction. Accordingly, for example, even in a case where there is a step having different heights in the left-right direction with respect to the traveling direction of the traveling apparatus 10 on the floor surface, the load distribution to the first left-side wheel 1L and the first right-side wheel 1R can be uniformly maintained by the first bogie link mechanism BL1.

Further, for example, even in a case where there is a step having different heights in the front-rear direction with respect to the traveling direction of the traveling apparatus 10 on the floor surface, the load distribution to the second left-side wheel 2L and the third left-side wheel 3L can be uniformly maintained by the second bogie link mechanism BL2, and the load distribution to the second right-side wheel 2R and the third right-side wheel 3R can be uniformly maintained by the third bogie link mechanism BL3. Therefore, the traveling stability of the traveling apparatus 10 can be improved.

Further, according to the above-described configurations, the load on the driving wheel against the road surface hardly changes. In addition, a driving wheel load of a constant ratio with respect to the vehicle body weight is always obtained. Therefore, the traveling stability especially when the traveling apparatus 10 conveys a heavy load is improved. In addition, since it is not necessary to increase the vehicle body weight for traveling stability, the traveling apparatus 10 can be reduced in size and weight.

Other Embodiments

The traveling apparatus 10 according to the present disclosure is not limited to the above-described embodiment, and may be the following embodiments.

In the above-described embodiment, the first bogie link mechanism BL1 including the first left-side wheel 1L, the first right-side wheel 1R, and the first link member L1 is disposed at the rear of the traveling unit 1. However, as another embodiment, the first bogie link mechanism BL1 may be disposed at the front of the traveling unit 1. That is, the first left-side wheel 1L and the first right-side wheel 1R may be front wheels.

Further, in the above-described embodiment, in the second bogie link mechanism BL2, the second left-side wheel 2L is constituted by a driving wheel, and the third left-side wheel 3L is constituted by a driven wheel. However, as another embodiment, the second left-side wheel 2L may be constituted by a driven wheel, and the third left-side wheel 3L may be constituted by a driving wheel. Similarly, as another embodiment of the third bogie link mechanism BL3, the second right-side wheel 2R may be constituted by a driven wheel, and the third right-side wheel 3R may be constituted by a driving wheel.

Further, as another embodiment, each of the first left-side wheel 1L and the first right-side wheel 1R constituting the first bogie link mechanism BL1 may be constituted by a driving wheel, and each of the wheels constituting the second bogie link mechanism BL2 and the third bogie link mechanism BL3 may be constituted by a driven wheel.

Figure 9:
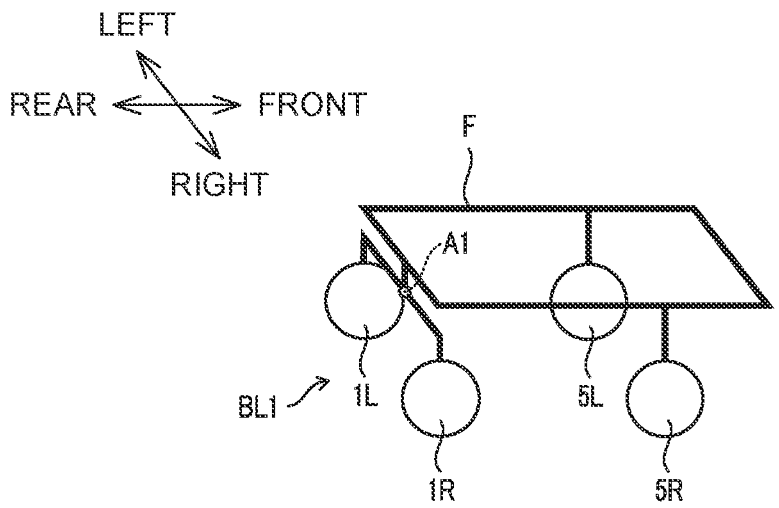
FIG. 9 is a schematic view showing another configuration of the bogie link mechanism of the traveling unit according to the embodiment of the present disclosure.

In the above-described embodiment, the traveling unit 1 includes the first bogie link mechanism BL1, the second bogie link mechanism BL2, and the third bogie link mechanism BL3. However, as another embodiment, the traveling unit 1 may include the first bogie link mechanism BL1, and the second bogie link mechanism BL2 and the third bogie link mechanism BL3 may be omitted. For example, as shown in FIG. 9, the traveling unit 1 may be configured to include the first bogie link mechanism BL1 including the first left-side wheel 1L, the first right-side wheel 1R, and the first link member L1, and a left-side wheel 5L and a right-side wheel 5R that are connected to the frame F. According to the configuration shown in FIG. 9, it is possible to improve the traveling stability at least relative to a step having different heights in the left-right direction with respect to the traveling direction of the traveling apparatus 10 on the floor surface.

Figure 10:
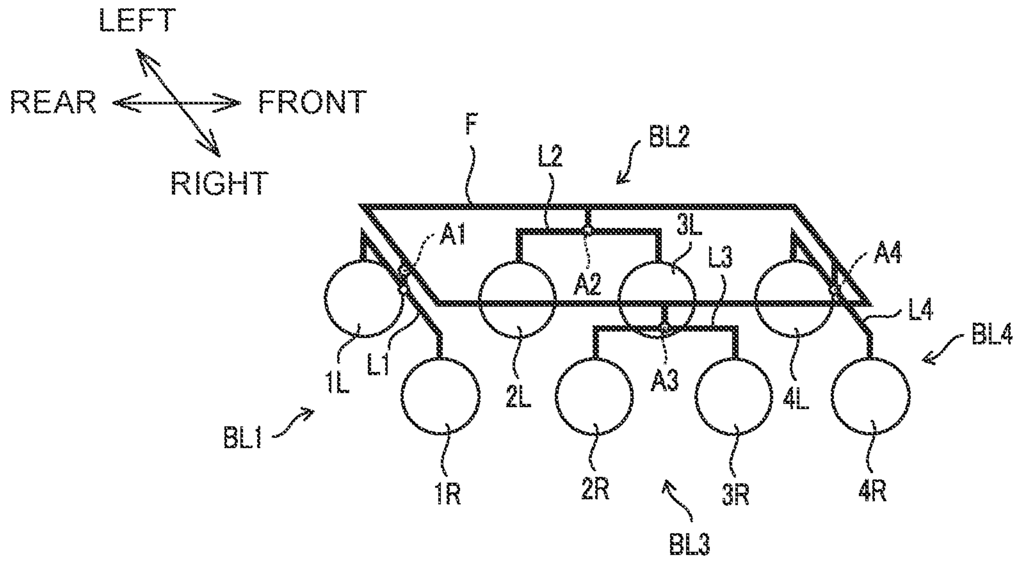
FIG. 10 is a schematic view showing still another configuration of the bogie link mechanism of the traveling unit according to the embodiment of the present disclosure.

In the above-described embodiment, the traveling unit 1 includes the bogie link mechanism (the first bogie link mechanism BL1) at the rear of the vehicle body. However, as another embodiment, the traveling unit 1 may include bogie link mechanisms at both the rear and the front of the vehicle body. For example, as shown in FIG. 10, the traveling unit 1 may include the first bogie link mechanism BL1 at the rear of the vehicle body, and may include a fourth bogie link mechanism BL4 constituted by a fourth left-side wheel 4L, a fourth right-side wheel 4R, and a fourth link member L4 (a fourth rotation shaft A4) at the front of the vehicle body.

Here, the traveling apparatus 10 (the traveling unit 1) may have a function of traveling along a guide member (for example, magnetic tape) disposed on the floor surface while detecting the guide member. In this case, in the traveling unit 1, the first left-side wheel 1L and the first right-side wheel 1R are disposed with a space therebetween that enables the first left-side wheel 1L and the first right-side wheel 1R to travel astride the guide member (see FIG. 7). Thus, the first left-side wheel 1L and the first right-side wheel 1R can function as a bogie link mechanism, and can prevent the guide member from being damaged because the first left-side wheel 1L and the first right-side wheel 1R do not ride on the guide member.

SUPPLEMENTARY NOTES OF THE DISCLOSURE

Hereinafter, a summary of the disclosure extracted from the above-described embodiments is described as supplementary notes. Note that each configuration and processing function explained in the supplementary notes below may be selected, omitted, and combined as appropriate.

<Supplementary Note 1>

A traveling apparatus comprising:

a first left-side wheel, a second left-side wheel, and a third left-side wheel disposed in a front-rear direction on a left side of a vehicle body; and a first right-side wheel, a second right-side wheel, and a third right-side wheel disposed in the front-rear direction on a right side of the vehicle body, on a front wheel side or a rear wheel side, the first left-side wheel is connected to a left end portion of a first link member extending in a left-right direction, the first right-side wheel is connected to a right end portion of the first link member, and a first rotation shaft disposed at an intermediate position of the first link member is attached to a frame of the vehicle body.

<Supplementary Note 2>

The traveling apparatus according to Supplementary Note 1, wherein the second left-side wheel is connected to one end portion of a second link member extending in the front-rear direction, the third left-side wheel is connected to another end portion of the second link member, and a second rotation shaft disposed at an intermediate position of the second link member is attached to the frame, and the second right-side wheel is connected to one end portion of a third link member extending in the front-rear direction, the third right-side wheel is connected to another end portion of the third link member, and a third rotation shaft disposed at an intermediate position of the third link member is attached to the frame.

<Supplementary Note 3>

The traveling apparatus according to Supplementary Note 1 or 2, wherein the second left-side wheel disposed between the first left-side wheel and the third left-side wheel and the second right-side wheel disposed between the first right-side wheel and the third right-side wheel are driving wheels, and the first left-side wheel, the third left-side wheel, the first right-side wheel, and the third right-side wheel are driven wheels.

<Supplementary Note 4>

The traveling apparatus according to any one of Supplementary Notes 1 to 3, wherein the second left-side wheel is disposed on the left side of the vehicle body relative to the first left-side wheel and the third left-side wheel with respect to a traveling direction, and the second right-side wheel is disposed on the right side of the vehicle body relative to the first right-side wheel and the third right-side wheel with respect to the traveling direction.

<Supplementary Note 5>

The traveling apparatus according to any one of Supplementary Notes 1 to 4, wherein the traveling apparatus has a function of traveling along a guide member disposed on a floor surface while detecting the guide member, and the first left-side wheel and the first right-side wheel are disposed with a space therebetween that enables the first left-side wheel and the first right-side wheel to travel astride the guide member.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A traveling apparatus comprising:

a first left-side wheel, a second left-side wheel, and a third left-side wheel disposed in a front-rear direction on a left side of a vehicle body; and a first right-side wheel, a second right-side wheel, and a third right-side wheel disposed in the front-rear direction on a right side of the vehicle body, wherein:

on a front wheel side or a rear wheel side, the first left-side wheel is connected to a left end portion of a first link member extending in a left-right direction, the first right-side wheel is connected to a right end portion of the first link member, and a first rotation shaft disposed at an intermediate position of the first link member is attached to a frame of the vehicle body, the second left-side wheel is connected to one end portion of a second link member extending in the front-rear direction, the third left-side wheel is connected to another end portion of the second link member, and a second rotation shaft disposed at an intermediate position of the second link member is attached to the frame, the second right-side wheel is connected to one end portion of a third link member extending in the front-rear direction, the third right-side wheel is connected to another end portion of the third link member, and a third rotation shaft disposed at an intermediate position of the third link member is attached to the frame, the second link member includes a second front-rear extending portion extending in the front-rear direction and a second left extending portion extending to the left side of the vehicle body from the second front-rear extending portion, the third left-side wheel is connected to the second front-rear extending portion, the second left-side wheel is connected to the second left extending portion, and the second rotation shaft is disposed in the second left extending portion and is attached to the frame, and the third link member includes a third front-rear extending portion extending in the front-rear direction and a third right extending portion extending to the right side of the vehicle body from the third front-rear extending portion, the third right-side wheel is connected to the third front-rear extending portion, the second right-side wheel is connected to the third right extending portion, and the third rotation shaft is disposed in the third right extending portion and is attached to the frame.

2. The traveling apparatus according to claim 1, wherein:

the second left-side wheel, disposed between the first left-side wheel and the third left-side wheel, and the second right-side wheel, disposed between the first right-side wheel and the third right-side wheel, are driving wheels, and the first left-side wheel, the third left-side wheel, the first right-side wheel, and the third right-side wheel are driven wheels.

3. The traveling apparatus according to claim 2, wherein: the second left-side wheel is disposed further on the left side of the vehicle body relative to the first left-side wheel and the third left-side wheel with respect to a traveling direction, and the second right-side wheel is disposed further on the right side of the vehicle body relative to the first right-side wheel and the third right-side wheel with respect to the traveling direction.

4. The traveling apparatus according to claim 1, further comprising a function of traveling along a guide member disposed on a floor surface while detecting the guide member, wherein the first left-side wheel and the first right-side wheel are disposed with a space therebetween, such that the first left-side wheel and the first right-side wheel travel astride the guide member.

* * * * *